US006486401B1

(12) United States Patent

Warhurst et al.

(10) Patent No.: US 6,486,401 B1
(45) Date of Patent: Nov. 26, 2002

(54) MULTI WELL PLATE COVER AND ASSEMBLY

(75) Inventors: Julian David Charles Warhurst, Ashland, MA (US); Andrew Frank Zaayenga, Martinsville, NJ (US)

(73) Assignee: le;.5qTekCel, Inc., Hopkinton, MA (US)

( * ) Notice: Subject to any disclaimer, the term of this patent is extended or adjusted under 35 U.S.C. 154(b) by 0 days.

(21) Appl. No.: 09/510,291

(22) Filed: Feb. 22, 2000

Related U.S. Application Data

(60) Provisional application No. 60/121,025, filed on Feb. 22, 1999.

(51) Int. Cl.[7] .................. H02G 3/14

(52) U.S. Cl. .................. 174/66; 174/67; 220/241; 220/242

(58) Field of Search .................. 174/50.5, 50.51, 174/17.05, 17 CT, 52.4, 66, 67, 50, 17.08; 220/241, 242; 312/328, 229; D8/353; D13/177

(56) References Cited

U.S. PATENT DOCUMENTS

| | | | | | |
|---|---|---|---|---|---|
| 3,206,017 | A | | 9/1965 | Williams | 206/56 |
| 3,302,854 | A | | 2/1967 | Midgley et al. | 229/43 |
| 3,366,265 | A | | 1/1968 | Hesselbarth | 220/23.4 |
| 3,858,752 | A | | 1/1975 | Marvin, Jr. et al. | 220/325 |
| 3,883,398 | A | | 5/1975 | Ono | 195/127 |
| 3,910,410 | A | | 10/1975 | Shaw | 206/363 |
| 4,246,339 | A | | 1/1981 | Cole et al. | 435/7 |
| 4,284,202 | A | | 8/1981 | Barstow, Jr. | 220/4 B |
| 4,391,780 | A | | 7/1983 | Boris | 422/102 |
| 4,392,389 | A | | 7/1983 | Eckstein et al. | 73/864.91 |
| 4,420,080 | A | | 12/1983 | Nakamura | 206/449 |
| 4,473,168 | A | | 9/1984 | Cox | 220/258 |
| 4,493,815 | A | | 1/1985 | Fernwood et al. | 422/101 |
| 4,495,289 | A | | 1/1985 | Lyman et al. | 435/284 |
| 4,569,438 | A | | 2/1986 | Sheffler | 206/37 |
| 4,626,509 | A | | 12/1986 | Lyman | 435/287 |
| 4,704,255 | A | | 11/1987 | Jolley | 422/101 |
| 4,777,021 | A | | 10/1988 | Wertz et al. | 422/101 |
| 4,847,050 | A | | 7/1989 | Jenkins et al. | 422/102 |
| 4,895,706 | A | | 1/1990 | Root et al. | 422/102 |
| 4,902,481 | A | | 2/1990 | Clark et al. | 422/101 |
| 4,927,604 | A | | 5/1990 | Mathus et al. | 422/101 |
| 4,948,442 | A | | 8/1990 | Manns | 156/73.1 |
| 4,948,564 | A | | 8/1990 | Root et al. | 422/101 |
| 5,011,779 | A | | 4/1991 | Maimon | 435/293 |
| 5,038,852 | A | | 8/1991 | Johnson et al. | 165/12 |
| 5,047,215 | A | | 9/1991 | Manns | 422/101 |
| 5,056,427 | A | | 10/1991 | Sakabe et al. | 100/211 |
| 5,065,885 | A | | 11/1991 | Scaroni | 220/326 |
| 5,076,933 | A | | 12/1991 | Glenn et al. | 210/641 |
| 5,094,355 | A | | 3/1992 | Clark et al. | 220/4.23 |
| 5,104,533 | A | | 4/1992 | Szabados | 210/257.1 |
| 5,108,704 | A | | 4/1992 | Bowers et al. | 422/70 |
| 5,110,556 | A | | 5/1992 | Lyman et al. | 422/101 |
| 5,112,574 | A | | 5/1992 | Horton | 422/102 |
| 5,130,105 | A | | 7/1992 | Carter et al. | 422/245 |
| 5,133,939 | A | | 7/1992 | Mahe | 422/104 |
| 5,141,719 | A | | 8/1992 | Fernwood et al. | 422/101 |
| 5,178,779 | A | | 1/1993 | Gironda et al. | 210/800 |
| 5,219,528 | A | | 6/1993 | Clark | 422/101 |
| 5,282,543 | A | | 2/1994 | Picozza et al. | 220/255 |
| 5,342,581 | A | | 8/1994 | Sanadi | 422/101 |
| 5,516,490 | A | | 5/1996 | Sanadi | 422/101 |
| 5,741,463 | A | | 4/1998 | Sanadi | 422/101 |
| 5,780,771 | A | * | 7/1998 | Beckwith et al. | 174/17.08 |
| 5,851,346 | A | | 12/1998 | Hitch | |
| 6,054,100 | A | * | 4/2000 | Stanchfield et al. | 432/102 |
| 6,083,682 | A | * | 7/2000 | Campbell et al. | 435/4 |
| 6,099,230 | A | | 8/2000 | Hitch | |
| 6,281,440 | B1 | * | 8/2001 | Baldwin et al. | 174/66 |
| 6,288,366 | B1 | * | 9/2001 | Chen | 174/66 |

FOREIGN PATENT DOCUMENTS

| | | |
|---|---|---|
| EP | 0311440 A2 | 10/1988 |
| EP | 0388159 A2 | 3/1990 |

* cited by examiner

*Primary Examiner*—Anthony Dinkins
*Assistant Examiner*—Dhiru R Patel
(74) *Attorney, Agent, or Firm*—Cesari and McKenna, LLP

(57) ABSTRACT

A sealing cover for a multi well plate includes a plurality of layers including a lid and a non-stick sealing layer. The sealing cover also includes a spring member for holding the multi well plate securely. The sealing cover is especially adapted for manipulation by a robotic apparatus.

17 Claims, 16 Drawing Sheets

MULTI WELL PLATE COVER AND ASSEMBLY

RELATED APPLICATIONS

This application claims the benefit of the filing date of U.S. provisional application Ser. No. 60/121,025, filed Feb. 22, 1999.

BACKGROUND OF THE INVENTION

1. Field of the Invention

This invention relates generally to multi well plates typically used in the chemical and biological arts and more specifically to an improved sealing plate cover for a multi well plate that is adapted for low or high temperature space efficient storage and robotic manipulation.

2. Brief Description of the Prior Art

It is common in performing chemical or biological tests to use a piece of laboratory equipment known as a micro or multi well plate. A multi well plate is typically a plastic plate containing an array of wells organized in regular horizontal and vertical rows. A multi well plate typically contains 24, 96, 384 or 1,536 wells. Multi well plates come in many configurations including shallow wells, half wells, deep wells, cube tubes, or mini tubes. The wells are used to contain compounds or chemicals in solution. A multi well plate can hold as little as 0.5 ul of compound.

When the multi well plate is not being used, it is stored, usually in a refrigerated storage locker. When the multi well plate is placed into or removed from storage, it may be handled with robotic machinery, such as a gripper. In its stored state, the multi well plate serves as a library of compounds or chemicals for future tests.

Unfortunately, existing covers for multi well plates tend to be loose-fitting. A loose-fitting seal does not significantly guard against evaporation, sublimation, absorption, or cross-contamination between wells. To overcome this limitation, a tight-fitting seal made of adhesive backed foil, Mylar or polyethylene is often applied by the end user. While the adhesive backed seal helps in preserving the integrity of the compounds, robotic equipment have a difficult time handling the adhesive backed cover. Consequently, the cover is usually removed manually due to the difficulty in automating adhesive backed seal removal.

SUMMARY OF INVENTION

The present invention is directed to solving the foregoing problems of the existing art.

In accordance with one preferred embodiment of the present invention, there is provided a cover for use in sealing a multi-well plate, the cover is adapted for robotic gripper manipulation. The cover comprises: 1) a lid plate defining a planar expanse sufficient to cover the multi-well plate; 2) a plurality of tabs protruding from the lid plate; 3) a compressible layer attached to one side of the lid plate; 4) a non-stick layer attached to the compressible layer; and 5) a torsion spring member connected to the sheet, the spring member is adapted, when in use, to rotationally engage the multi-well plate to hermetically seal the multi-well plate by applying an upward force thereto.

In accordance with another preferred embodiment of the present invention, there is provided a sealed multi-well plate, comprising: 1) a plate defining a plurality of containment wells; 2) a non-stick layer disposed on and extending over the majority of the principal surface of the plate; 3) a compressible layer attached to the non-stick layer; 4) a lid disposed on the compressible layer having a torsion spring member, the spring member adapted to rotationally engage the multi-well plate to compress the compressible layer and the non-stick layer on the principal surface of the plate thus, hermetically sealing the containment wells; and 5) a plurality of tabs protruding from the lid plate to aid in robotic gripper manipulation.

Each of the preferred embodiments further comprises a lid plate made from, either alone or in combination, metal, polyethylene, polycarbonate, polypropylene, polystyrene, or the like.

Each of the preferred embodiments further comprises a compressible layer made from, either alone or in combination, silicone rubber, silicone foam, neoprene rubber, polyurethane foam or the like.

Each of the preferred embodiments further comprises a non-stick layer made from, either alone or in combination, Teflon, Mylar, polypropylene or the like.

Each of the preferred embodiments further comprises a retractable wire torsion spring member, preferably of stainless steel, the spring member, when not in use, retracts to minimize space requirements.

Each of the preferred embodiments further comprises notches on the lid plate for ease in the stacking of the covers alone or when attached to the multi well plate.

These and other features, aspects, and advantages of the present invention will become better understood with regard to the following description, appended claims, and accompanying drawings.

BRIEF DESCRIPTION OF THE DRAWINGS

Turning now to the drawings.

DETAILED DESCRIPTION OF A PREFERRED EMBODIMENT OF THE INVENTION

Figure 1A:
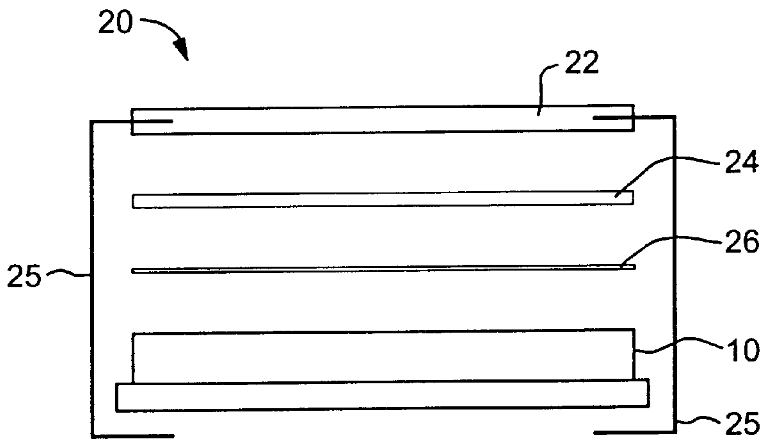
FIG. 1 is an exploded view of a preferred embodiment of a sealing cover of this invention, a cross-sectional view of the sealing cover and a cross-sectional view of the sealing cover attached to the well plate.
Figure 1B:
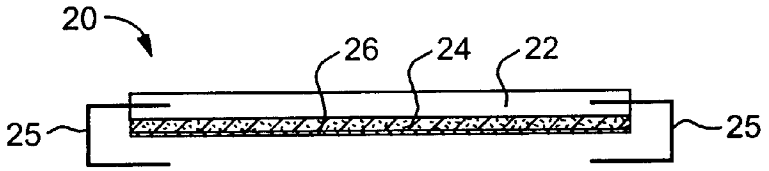
Figure 1C:
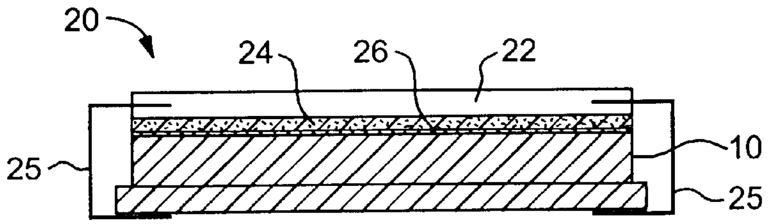

FIG. 1 consists of several views of a preferred embodiment of the present invention made with pre-selected materials. FIG. 1A is an exploded view of plate sealing cover 20 and multi well plate 10. Plate sealing cover 20 comprises a thin polypropylene or Teflon seal 26, preferably polypropylene, that covers the wells of multi well plate 10. On top of the polypropylene or Teflon seal is a soft material, such as neoprone backing or silicon foam 24, that helps apply an even force to polypropylene or Teflon seal 26. Finally, there is a plastic or metal lid 22 that is held on top of multi well plate 10 by legs 25 that run underneath mutli well plate 10. These legs may be crimped in place or spring loaded. FIG. 1B is a cross-sectional view of plate sealing cover 20. FIG. 1C is a cross-sectional view of plate sealing cover 20 assembled to multi well plate 10.

Figure 2:
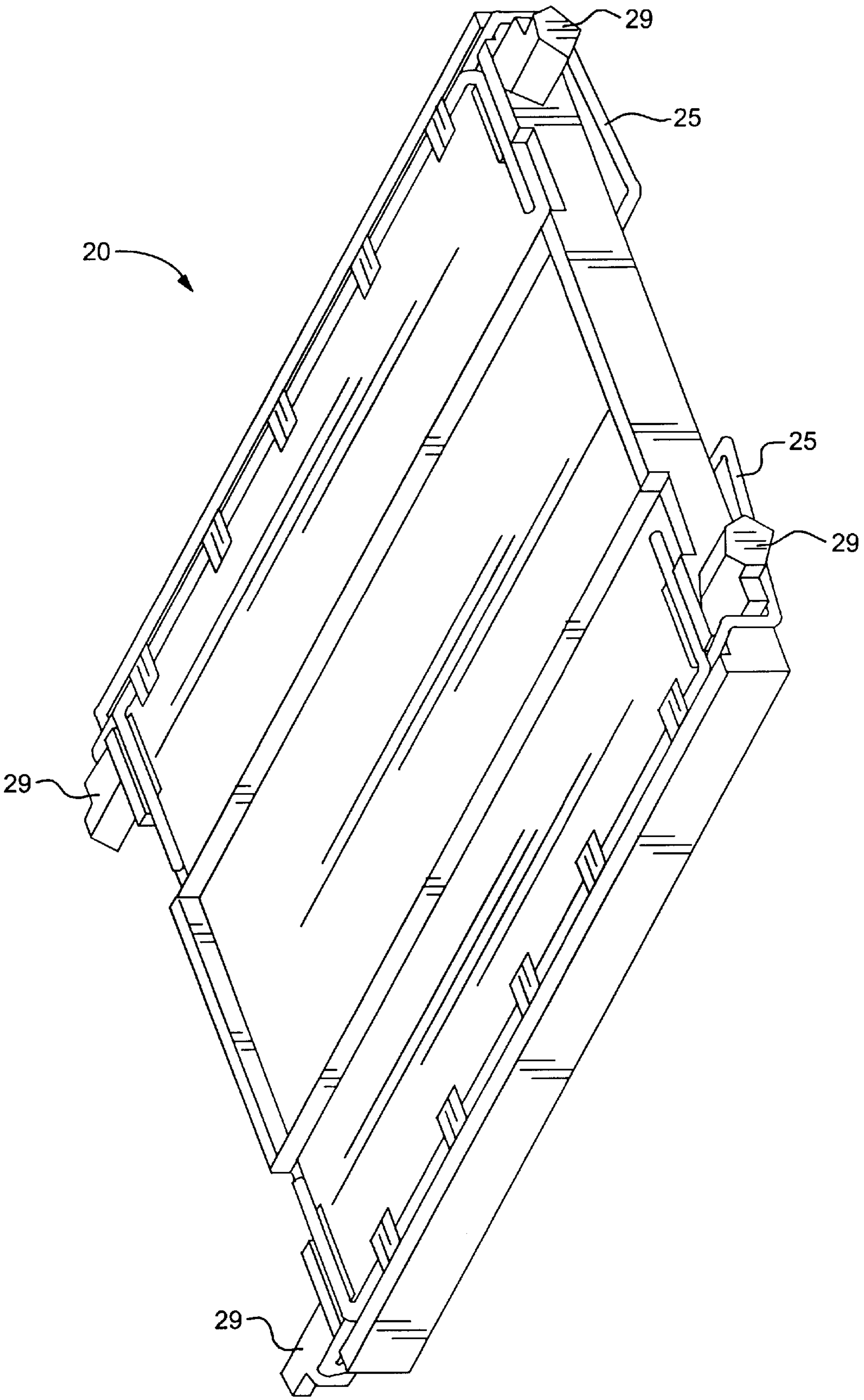
FIG. 2 is a plan view of the preferred embodiment of the sealing cover.

FIG. 2 is a plan view of the preferred embodiment of the sealing cover.

Figure 3A:
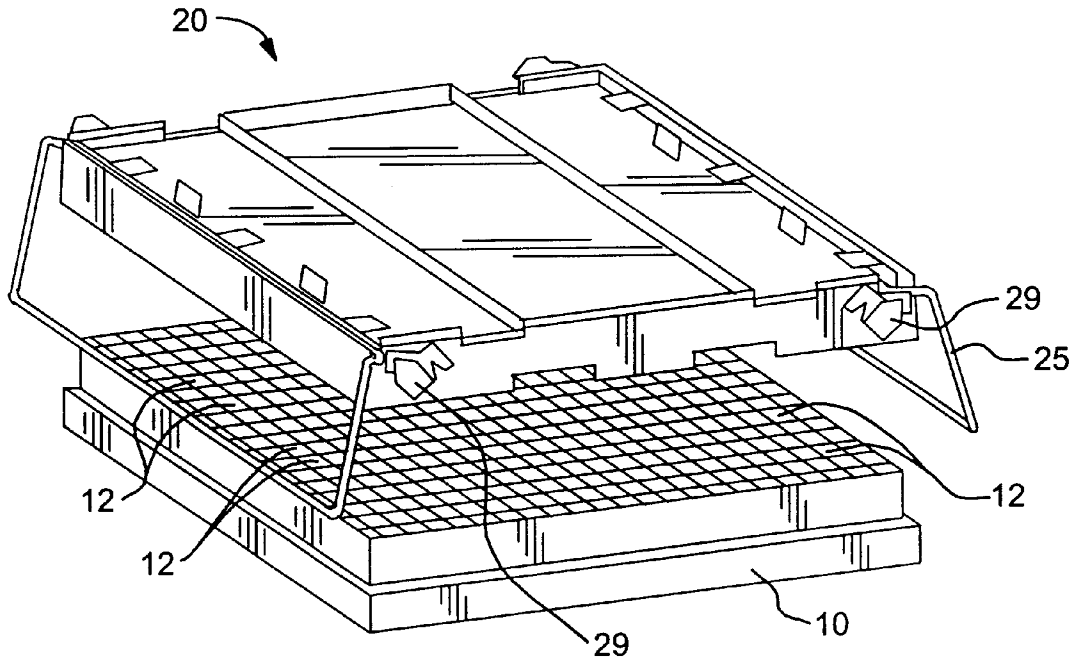
FIG. 3 are perspective views of the preferred embodiment of the sealing cover, before and after attachment to the multi well plate.
Figure 3B:
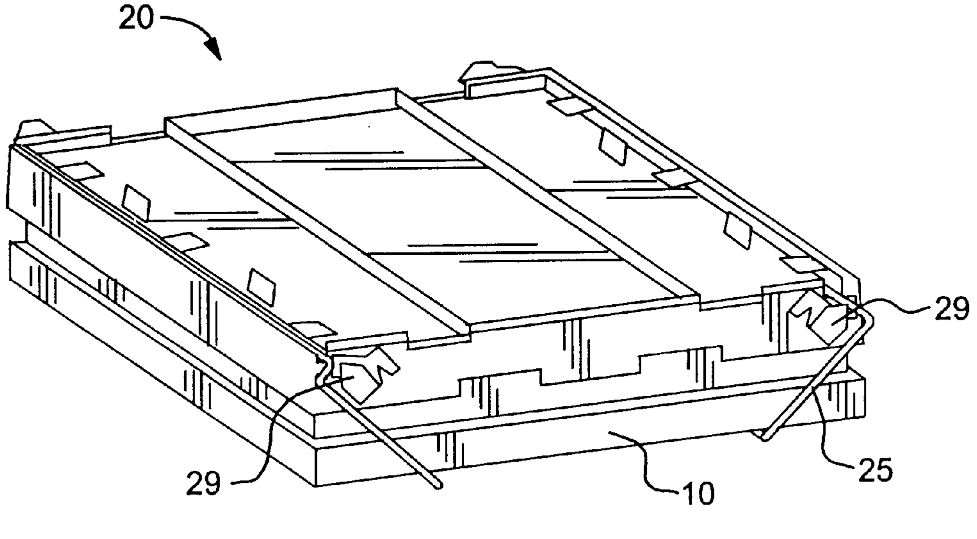

FIGS. 3A and 3B are perspective views of the preferred embodiment of the sealing cover, before, FIG. 3A, and after, FIG. 3B, attachment to multi well plate 10 which defines a plurality of containment wells 12.

Figure 4:
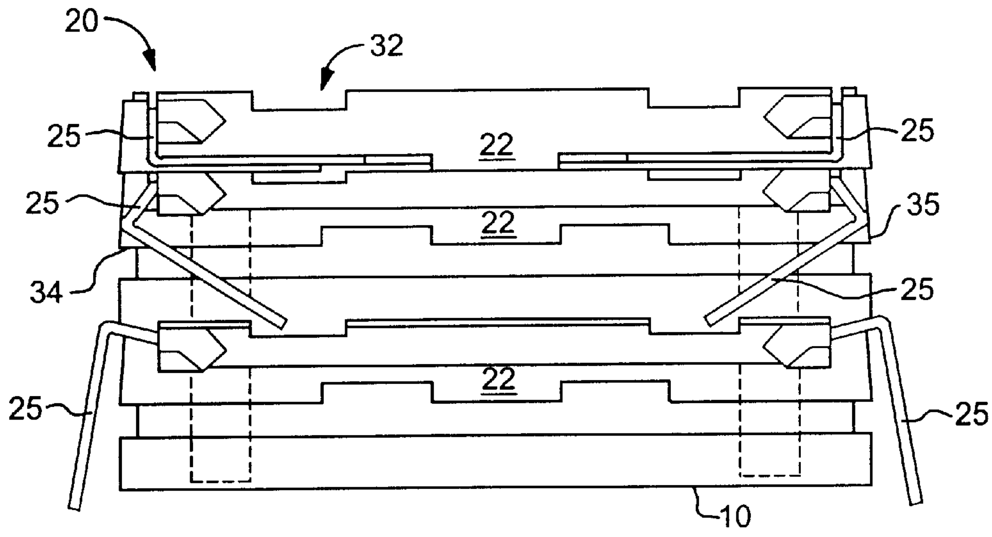
FIG. 4 is a cross-sectional view of a stack consisting of the preferred embodiment of the sealing cover alone and attached to the multi well plate.

FIG. 4 is a cross-sectional view of a stack consisting of two covered multi well plates and a sealing cover alone. Leg clearance notches 32 on the top and bottom of the sealing cover allow for stacking of plate sealing covers on covers and also covered multi well plates onto one another. Torsion spring leg design 25 provides maximum upward force for optimal plate sealing and can be rotated fully clear to allow for ease of installation and removal of cover. Legs 25 are fully retractable thus minimizing space requirements. Additional features shown include: 34, minimal clearance between cover and side of plate ensures correct alignment, thus, minimizing the possibility of cross-contamination when cover is removed and then replaced onto the same plate; and 35, minimal footprint reduces space requirements and increases compatibility with other instruments.

Figure 5:
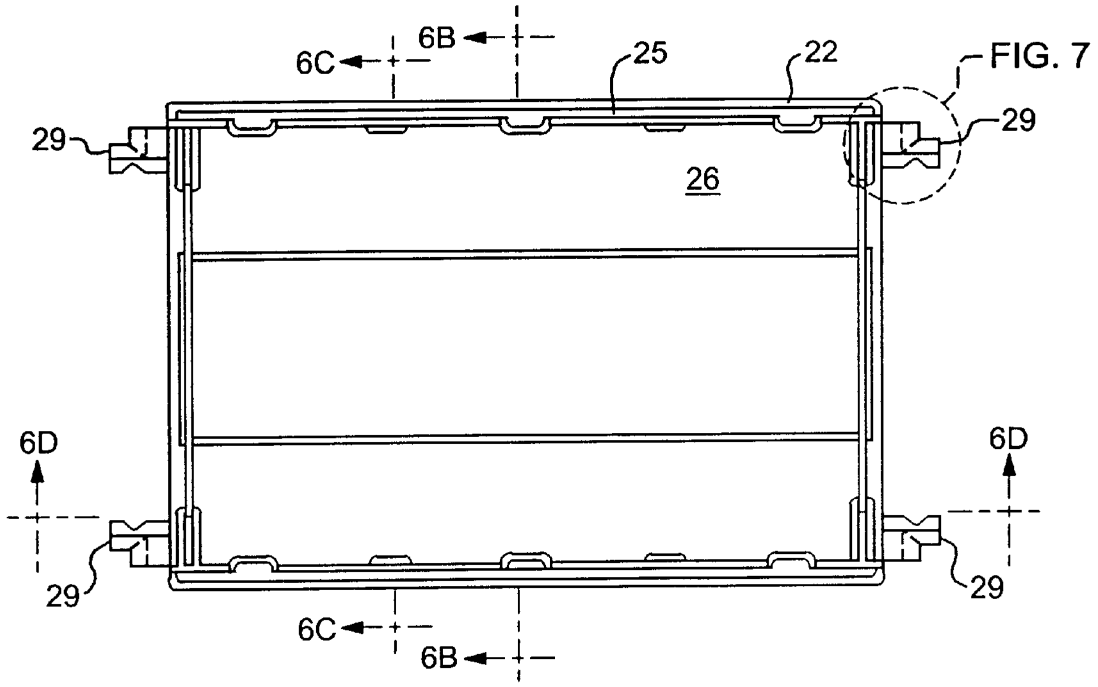
FIG. 5 is a plan view of the preferred embodiment of the sealing cover.
Figure 6A:
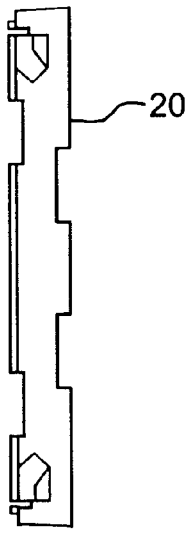
FIG. 6 shows side views of the preferred embodiment of the sealing cover and a front view of the sealing cover.
Figure 6B:
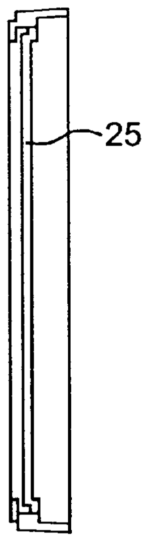
Figure 6C:
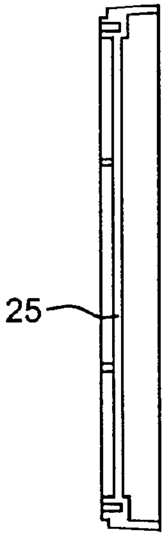
Figure 6D:
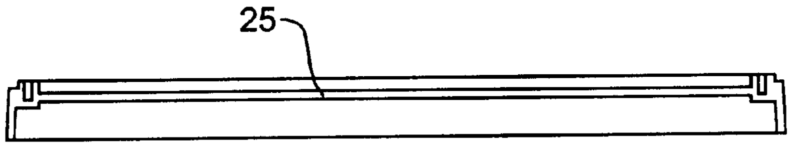
Figure 6E:

FIG. 5 is a plan view of the underside of the plate cover with legs 25 retracted.

FIG. 6 shows several side views of the preferred embodiment of the sealing cover and a front view of the sealing cover.

Figure 7:
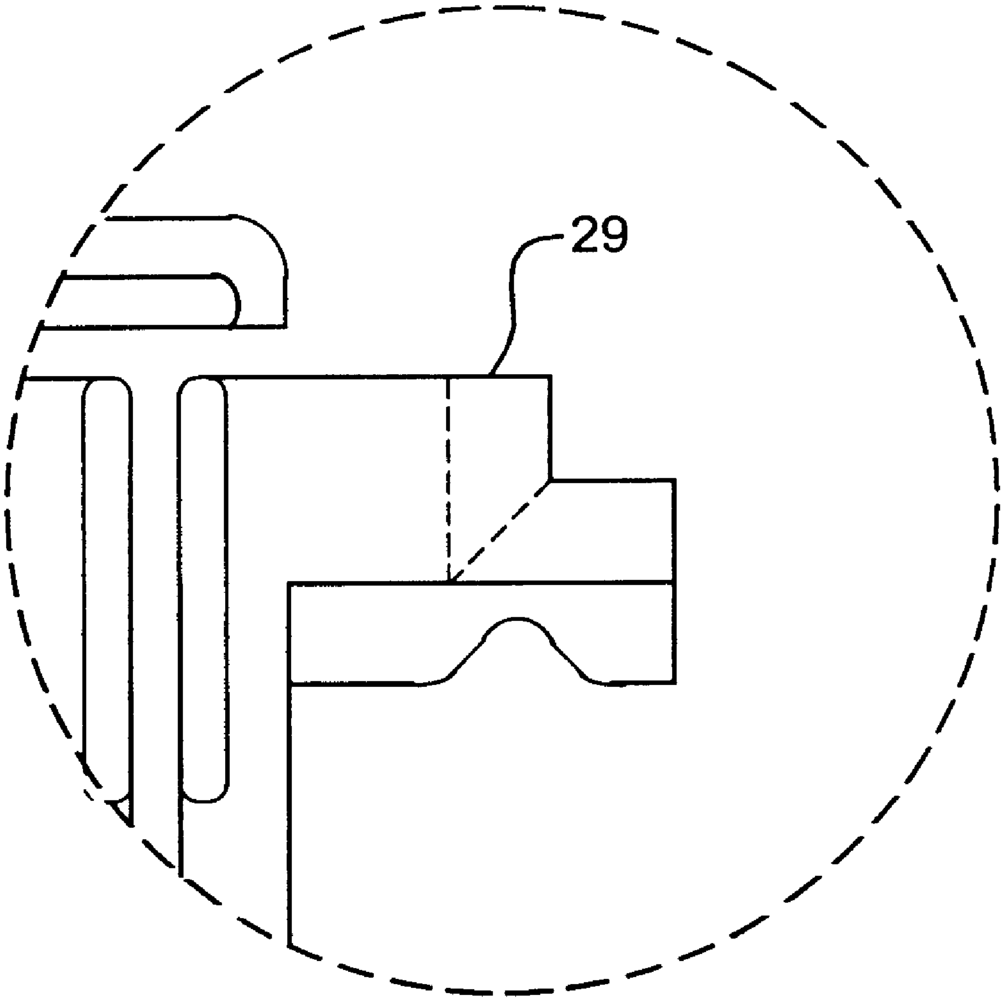
FIG. 7 is a plan view of a detail of the preferred embodiment of the sealing cover.

FIG. 7 is a detailed plan view of tab 29 of the preferred embodiment of the sealing cover.

Figure 8:
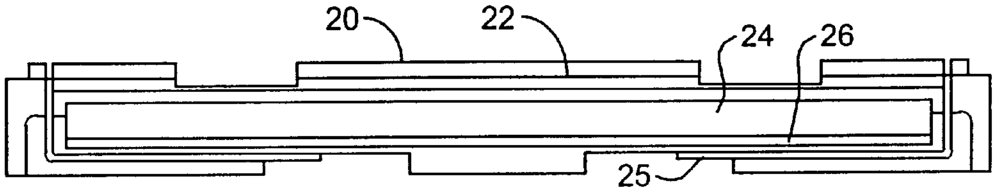
FIG. 8 is another cross-sectional view of the preferred embodiment of the sealing plate cover.

FIG. 8 again shows the sealing plate cover assembly 20 comprising a non-stick sealing layer 26, a compressible layer 24, lip 22 and a torsion spring wire legs 25. The non-stick sealing layer 26 is bonded, made integral or otherwise is attached to compressible layer 24. The compressible layer 24 is, in turn, bonded, made integral or otherwise is attached to lid 22. (see FIG. 1 for an exploded view of the embodiment.)

Sealing layer 26 is made of polypropylene, Teflon, Mylar or similar material. Compressible layer 24 is made of a soft material such as neoprene rubber, silicone rubber, silicone foam, polyurethane foam that helps supply an even force to sealing layer 26 covering the wells of the multi well plate. Lid 22 could be made from metal or a plastic polymer such as polyethylene, polycarbonate, polypropylene and polystyrene. Torsion spring wire legs 25 are preferably made of stainless steel. However, it should be noted that each of the foregoing elements, (specifically, non-stick sealing layer 26, compressible layer 24, lid 22 and torsion spring wire legs 25) of the invention are not necessarily limited to the aforementioned list of materials. Any material having similar characteristics and functions required by the element in question can be suitably substituted.

Figure 9A:
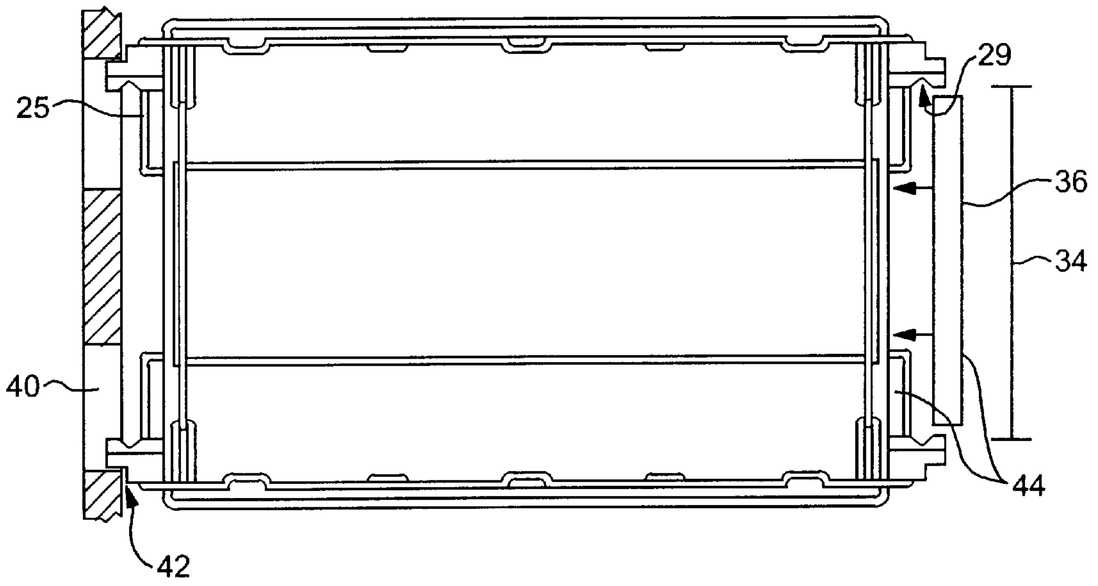
FIG. 9 is a plan view of the preferred embodiment of the sealing cover and a cross-sectional view of the sealing cover attached to the multi well plate being held by a robotic gripper.
Figure 9B:
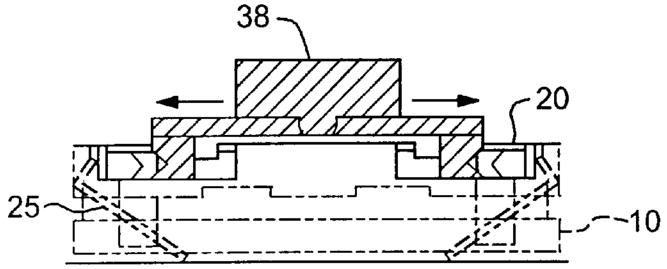

Referring to FIG. 9, tab-and channel grooves 34 located on top of sealing cover 20 hold spring wire legs 25 in place without the need for additional fasteners. Additionally, clearance gap 44 allows for a hook-type mechanism to be used to rotate spring wire legs 25 during installation and removal. The large span between tabs 29 allows robots to manipulate sealing plate cover 20 and/or the covered multi well plate with a standard gripper 36 or a custom robotic gripper 38. In operation, keyed gripper 38 with pin will engage the beveled tab and notch on sealing plate cover 20. Outer notches 42 on tabs 29 with beveled bottom edges allow for simple storage rack design 40.

Figure 10A:
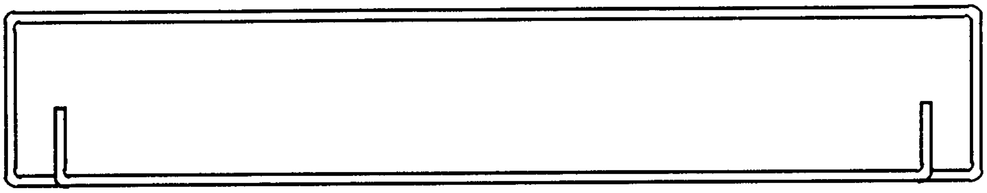
FIG. 10 is a plan view of the spring member included in the preferred embodiment.
Figure 10B:
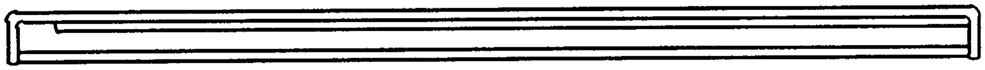
Figure 10C:
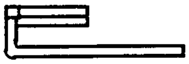

FIG. 10 is a detailed view of spring wire leg 25.

Figure 11:
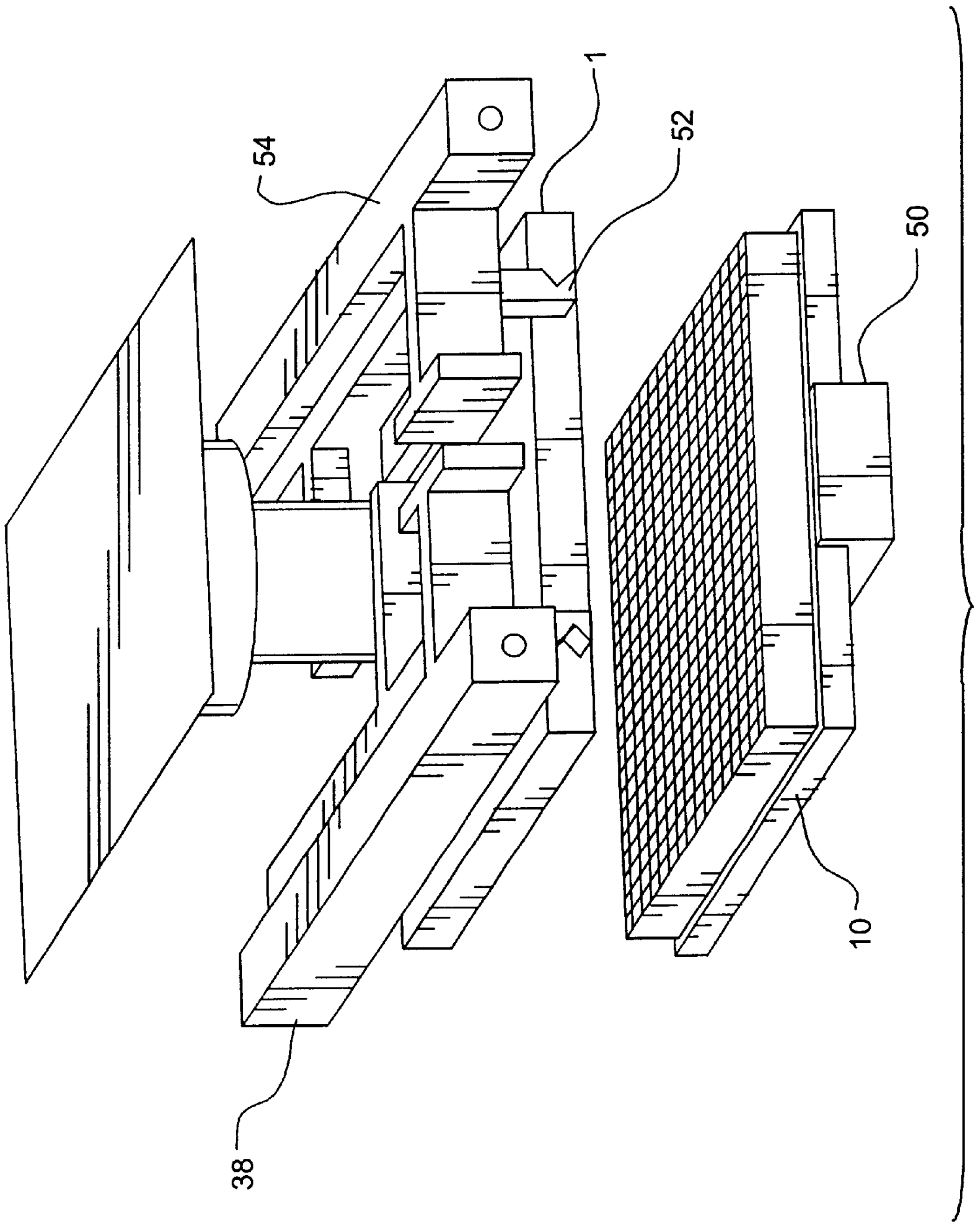
FIG. 11 is a perspective view of a robotic gripper holding the preferred embodiment of the sealing cover.

In FIG. 11, a custom robotic gripper 38 is shown having a plate holder 50, plate cover grippers 52 and rotary wire spreaders 54. Sealing plate cover 20 is held by plate cover gripper 52 and multi well plate 10 is held by plate holder 50.

Figure 12:
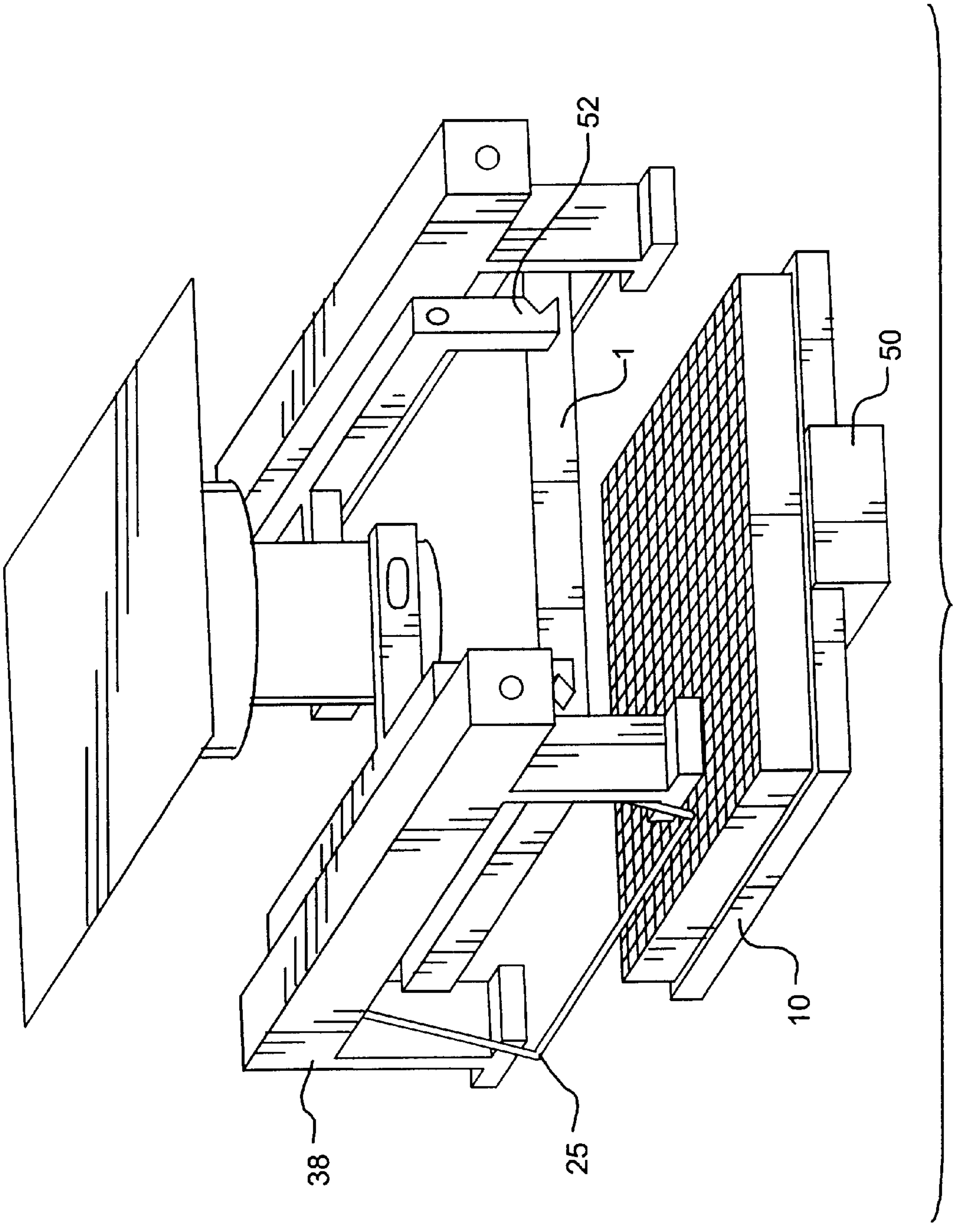
FIG. 12 is another perspective view of the robotic gripper holding the preferred embodiment of the sealing cover.

FIG. 12 shows the plate cover grippers 52 in the closed position and spring wire legs 25 are shown rotated by the rotary wire spreader 54 to an open position.

Figure 13:
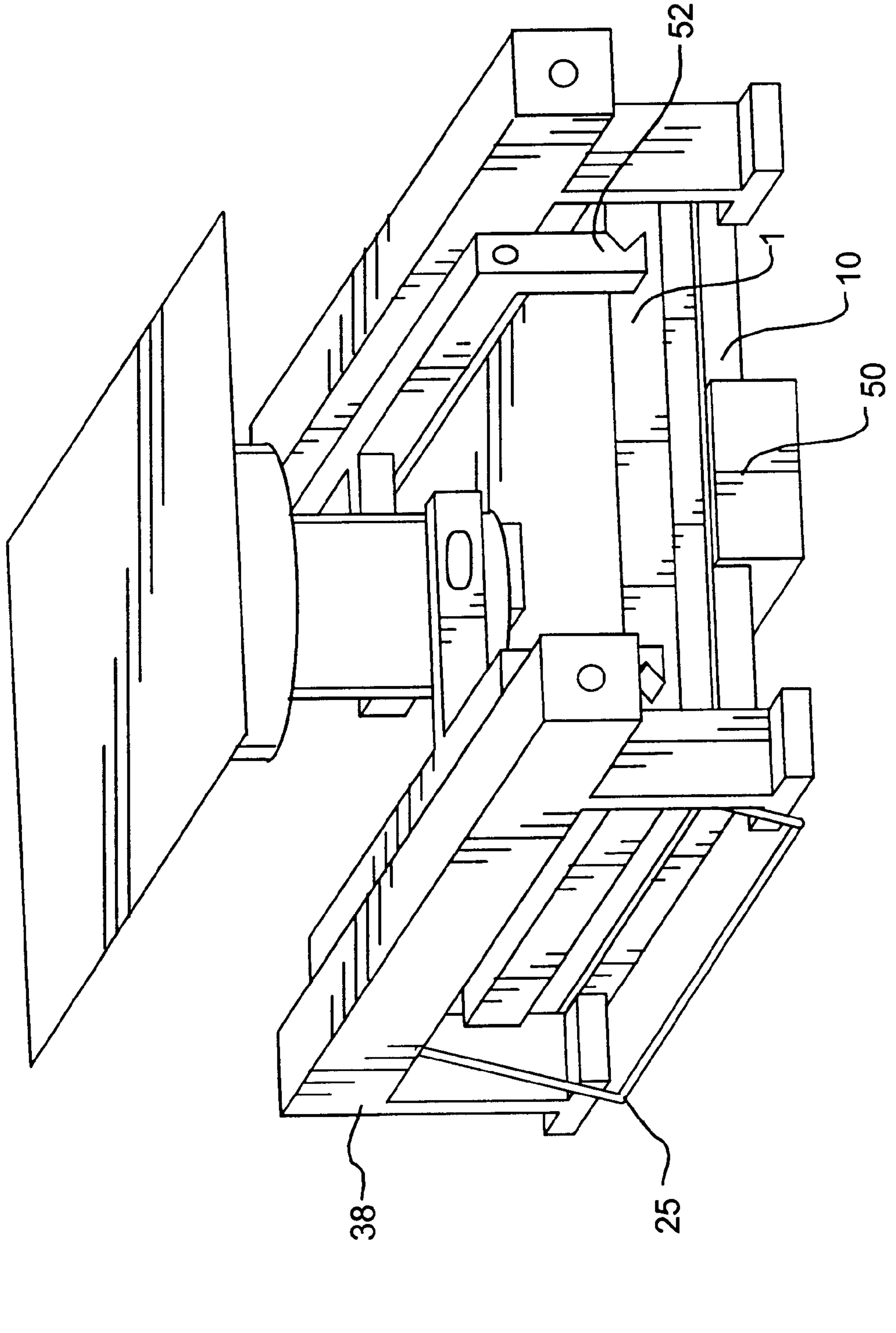
FIG. 13 is a perspective view of the robotic gripper holding the preferred embodiment of the sealing cover, with the robotic gripper lowered to the attach position.

FIG. 13 shows cover 20 lowered by gripper 38 onto plate 10 into the attach position.

Figure 14:
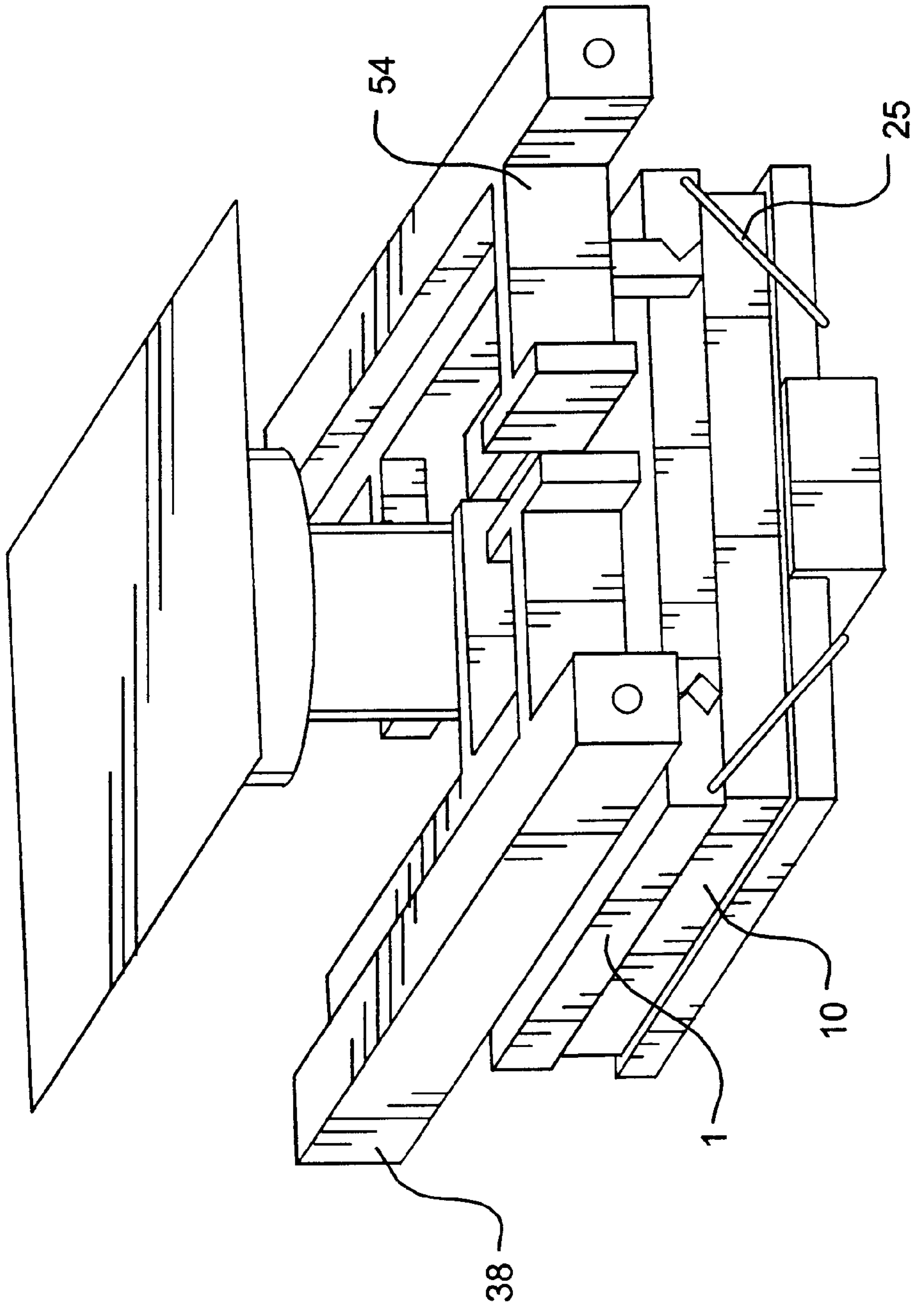
FIG. 14 is a perspective view of the robotic gripper holding the preferred embodiment of the sealing cover, with the robotic gripper lowered to the attach position and with the rotary wire spreaders in release position.
Figure 15B:
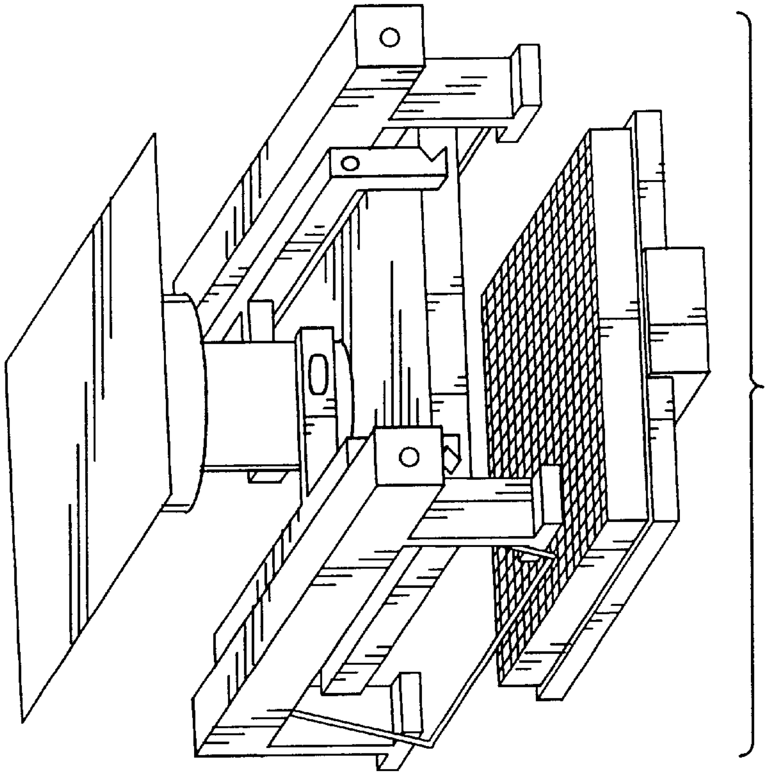
FIG. 15 shows the robotic gripper in operation.
Figure 15A:
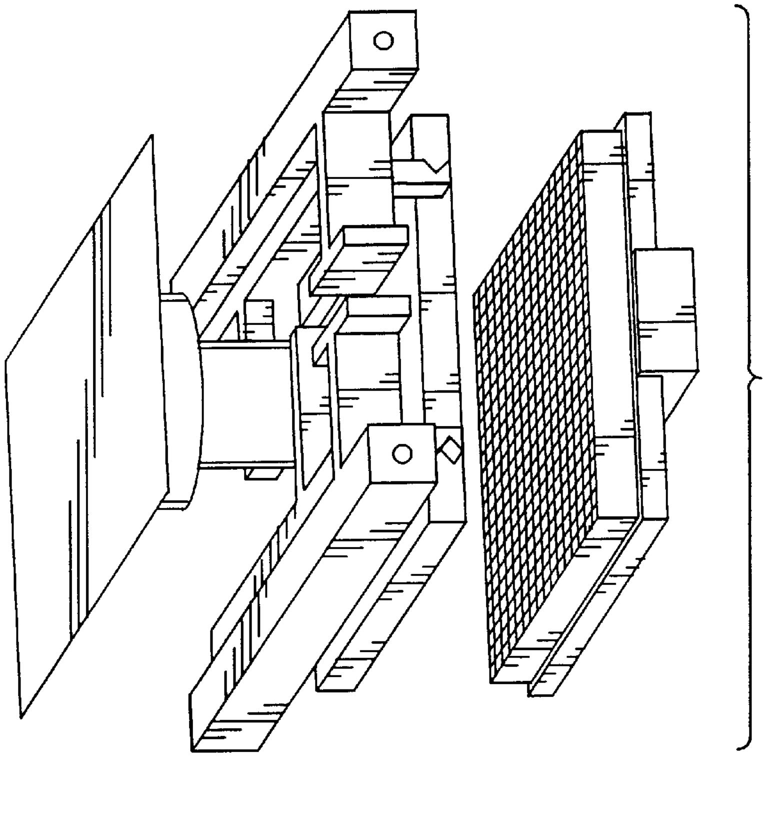
Figure 15D:
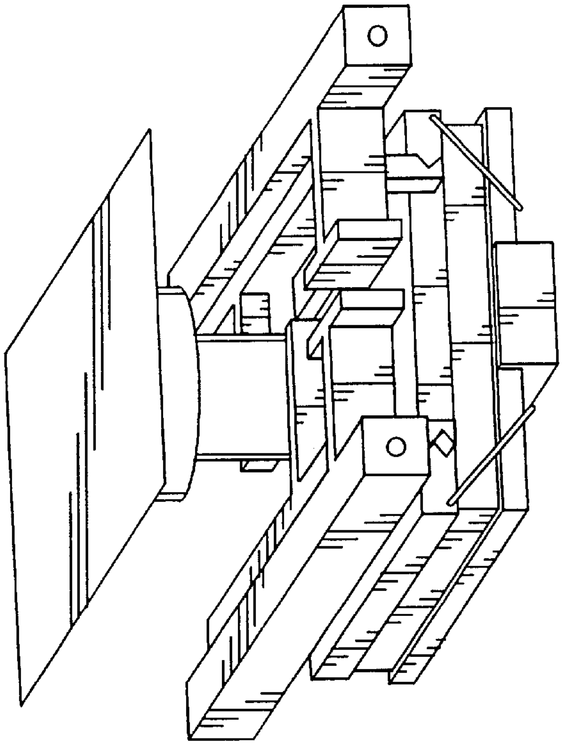
Figure 15C:
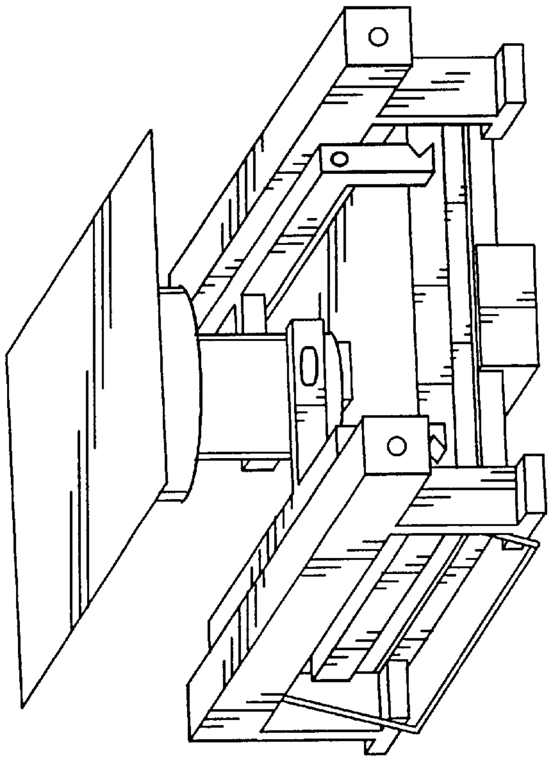

FIG. 14 shows rotary wire spreaders 54 rotated to the release position, spring wire legs 25 released and plate cover 20 attached to multi well plate 10.

FIG. 15 shows the robotic gripper in action. At step 1, the sealing plate cover and multi well plate is attached to the gripper. At step 2, the torsion spring wire retaining legs are spread. At step 3, the cover is lowered onto the plate. Finally, at step 4, the spring wires are released and the plate is sealed. The plate may, thereafter, be carried away by the same robotic gripper for storage purposes or other purposes or it may be left in place for other operations.

Figure 16:
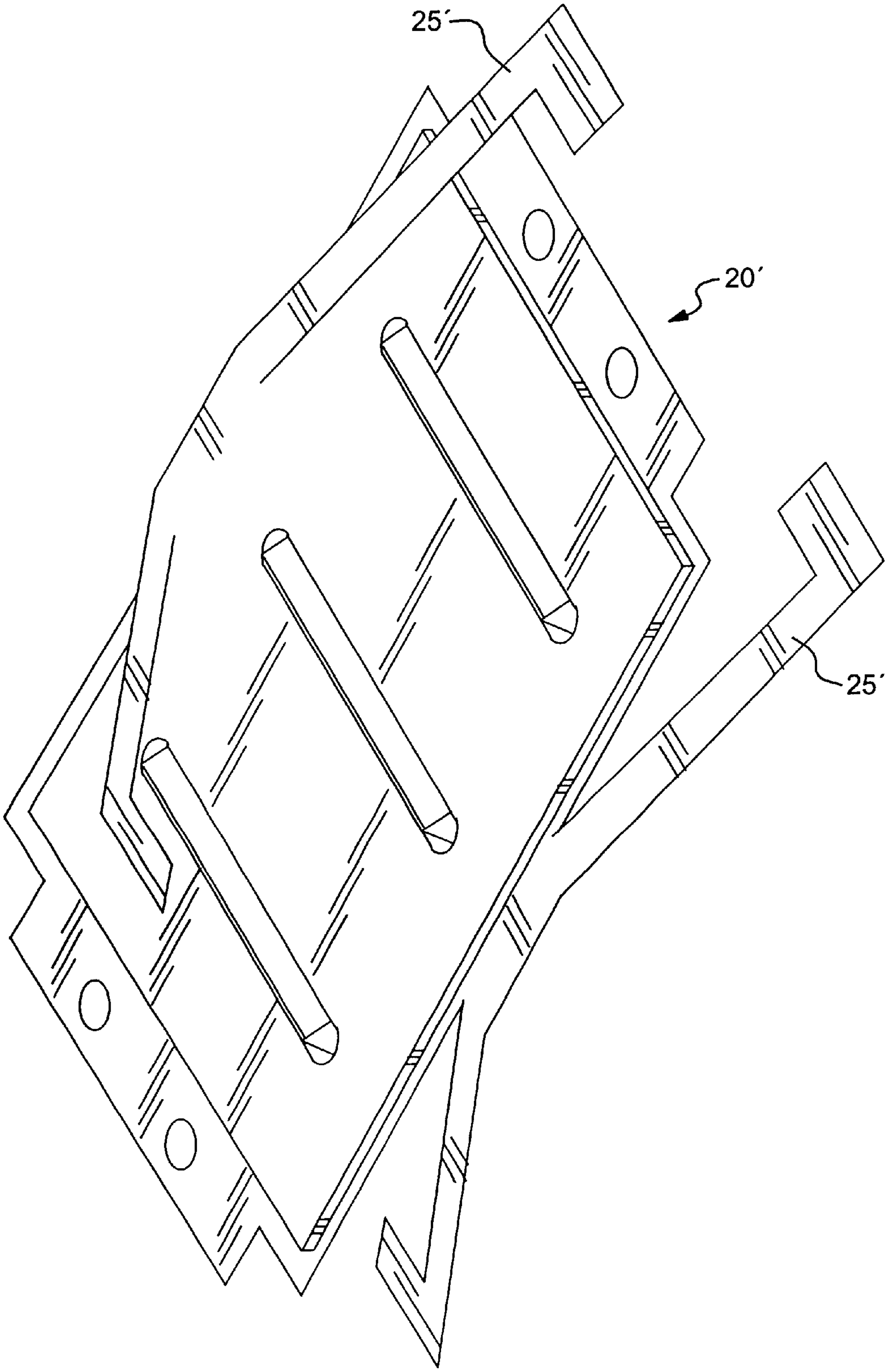
FIG. 16 shows one view of a second embodiment of the present invention.

FIG. 16 shows a second embodiment of a sealing plate cover 20' with legs 25' in the open position.

Figure 17:
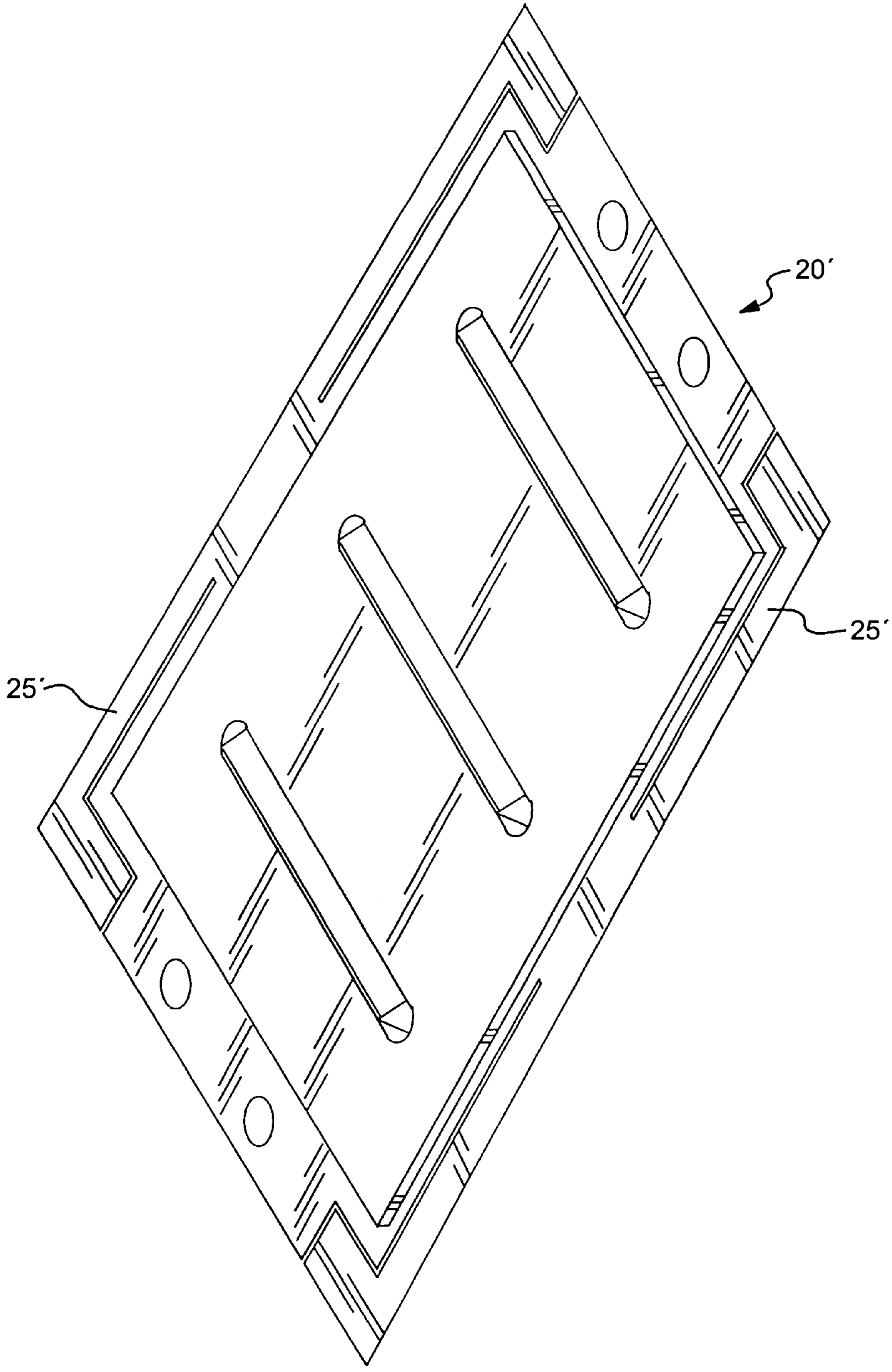
FIG. 17 shows another view of the embodiment of FIG. 16.

FIG. 17 shows the second embodiment of sealing plate cover 20' with legs 25' in the closed position.

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A cover for use in sealing a multi-well plate, said cover adapted for robotic gripper manipulation, comprising:

a. a lid plate defining a planar expanse sufficient to cover said multi-well plate;

b. a plurality of tabs protruding from said lid plate;

c. a compressible layer attached to one side of said lid plate;

d. a non-stick layer attached to said compressible layer; and e. at least one torsion spring member connected to said lid plate, said spring member adapted, when in use, to rotationally engage said multi-well plate to provide an upward force to hermetically seal said multi-well plate.

2. The cover of claim 1, wherein said lid plate is formed of a material chosen from the group consisting of polyethylene, polycarbonate, polypropylene, poly-styrene and metal.

3. The cover of claim 1, wherein said compressible layer is formed of a material chosen from the group consisting of silicone rubber, silicone foam, neoprene rubber and ployurethane foam.

4. The cover of claim 1, wherein said non-stick layer is formed of a material chosen from the group consisting of polypropylene, Teflon and Mylar.

5. The cover of claim 1, wherein said torsion spring member is a wire.

6. The cover of claim 5, wherein said wire is made of stainless steel.

7. The cover of claim 1 wherein said spring member, when not in use, retracts to minimize space requirements.

8. The cover of claim 1 further comprising clearance notches on said lid plate for the stacking of said covers.

9. A sealed multi-well plate, comprising:

a. a multi-well plate having a principal surface and defining a plurality of containment wells opening at said principal surface;

b. a non-stick layer disposed on and extending over the majority of said principal surface of said multi-well plate;

c. a compressible layer attached to said non-stick layer;

d. a lid plate disposed on said compressible layer having at least one torsion spring member, said spring member adapted to rotationally engage said multi-well plate thereby compressing said compressible layer and said non-stick layer onto said principal surface of said multi-well plate to hermetically seal said containment wells; and e. a plurality of tabs protruding from said lid plate to aid in robotic gripper manipulation.

10. The assembly of claim 9, wherein said lid plate is formed of a material chosen from the group consisting of polyethylene, polycarbonate, polypropylene, polystyrene and metal.

11. The assembly of claim 9, wherein said compressible layer is formed of a material chosen from the group consisting of silicone rubber, silicone foam, neoprene rubber and polyurethane foam.

12. The assembly of claim 9, wherein said non-stick layer is formed of a material chosen from the group consisting of polypropylene, Teflon and Mylar.

13. The assembly of claim 9, wherein said torsion spring member is a wire.

14. The assembly of claim 13, wherein said wire is made of stainless steel.

15. The assembly of claim 9, wherein said spring member, when not in use, retracts to minimize space requirements.

16. The assembly of claim 9, further comprising clearance notches on said lid plate.

17. A cover for use in sealing a multi-well plate, said cover adapted for robotic gripper manipulation, comprising:

a. a lid plate defining a planar expanse sufficient to cover said multi-well plate;

b. a plurality of tabs protruding from said lid plate;

c. a compressible layer attached to one said of said lid plate;

d. a non-stick layer attached to said compressible layer; and e. at least one locking member connected to said lid plate, said locking member adapted, when in use, to rotationally engage said multi-well plate to hermetically seal said multi-well plate.

* * * * *